(12) United States Patent
Maresh et al.

(10) Patent No.: US 12,162,594 B2
(45) Date of Patent: Dec. 10, 2024

(54) CHORD LOCK ASSEMBLY FOR A TILTROTOR AIRCRAFT

(71) Applicant: Bell Textron Inc., Fort Worth, TX (US)

(72) Inventors: Andrew Maresh, Colleyville, TX (US); Kyle Cravener, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 147 days.

(21) Appl. No.: 17/410,442

(22) Filed: Aug. 24, 2021

(65) Prior Publication Data

US 2023/0067093 A1   Mar. 2, 2023

(51) Int. Cl.
| | |
|---|---|
| *B64C 27/32* | (2006.01) |
| *B64C 11/04* | (2006.01) |
| *B64C 11/28* | (2006.01) |
| *B64C 27/37* | (2006.01) |
| *B64C 29/00* | (2006.01) |

(52) U.S. Cl.
CPC ............ *B64C 27/322* (2013.01); *B64C 11/04* (2013.01); *B64C 11/28* (2013.01); *B64C 27/37* (2013.01); *B64C 29/0033* (2013.01)

(58) Field of Classification Search
CPC ......... B64C 11/04; B64C 11/28; B64C 27/30; B64C 27/322; B64C 27/37; B64C 29/0033
See application file for complete search history.

(56) References Cited

U.S. PATENT DOCUMENTS

| | | | | |
|---|---|---|---|---|
| 3,749,515 | A * | 7/1973 | Covington | B64C 27/50 416/143 |
| 4,466,775 | A * | 8/1984 | Martin | B64C 27/50 416/158 |
| 2016/0083087 | A1* | 3/2016 | Schank | B64C 27/32 416/134 A |
| 2016/0152329 | A1* | 6/2016 | Tzeng | B64C 11/28 29/889.1 |
| 2020/0039633 | A1* | 2/2020 | Cravener | B64C 27/50 |

\* cited by examiner

*Primary Examiner* — Brian P Wolcott
*Assistant Examiner* — Jesse M Prager
(74) *Attorney, Agent, or Firm* — Akona IP PC (57) ABSTRACT

Disclosed is a blade lock assembly, which may include a drag brace coupled to a fold crank assembly and to a rotary wing blade and may further include an actuator assembly configured to be coupled to a rotary wing cuff. The actuator assembly may include an actuator pin housing, an actuation pin at least partially sheathed by the actuator pin housing, and an actuator configured to extend and retract the actuation pin away from and toward the actuator pin housing.

12 Claims, 7 Drawing Sheets

CHORD LOCK ASSEMBLY FOR A TILTROTOR AIRCRAFT

STATEMENT REGARDING FEDERALLY SPONSORED RESEARCH OR DEVELOPMENT

Not applicable.

TECHNICAL FIELD OF THE DISCLOSURE

The present disclosure relates, in general, to tiltrotor aircraft operable for vertical takeoff and landing in a helicopter flight mode and high speed forward cruising in a jet mode and, in particular, to tiltrotor aircraft operable for transitions between rotary and non-rotary flight modes.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of tiltrotor aircraft in forward flight.

SUMMARY

An implementation of a tiltrotor aircraft assembly may include a plurality of rotary wing blades and a blade lock assembly coupled to a respective rotary wing blade. The blade lock assembly may include a drag brace coupled to a fold crank and to a rotary wing blade and may further include an actuator assembly coupled to a cuff. The actuator assembly may include an actuator pin housing and an actuation pin at least partially sheathed by the actuator pin housing. The actuator assembly may be configured to extend and retract the actuation pin away from and toward the actuator pin housing.

The drag brace may include a finger extending from the drag brace toward the actuator pin housing. An actuator pin engagement surface may be defined on the finger and may be configured to engage the actuator pin when the blade lock assembly is in a locked configuration.

The actuator pin housing may define an actuation pin housing recess. A tab may extend from the finger toward the defined actuation pin housing recess and may be configured to engage the defined actuation pin housing recess when the blade lock assembly is in a locked configuration.

The drag brace may be on a first side of the actuator pin housing when the blade lock assembly is in a locked configuration and the cuff may be on a second side of the actuator pin housing when the blade lock assembly is in a locked configuration. The second side may substantially oppose the first side.

The actuator assembly may be in a position between the drag brace and the cuff when the blade lock assembly is in a locked configuration. The rotary blade assembly may be configured to actuate the actuation pin via a rotary displacement motion or in a linear, e.g., axial, displacement motion.

The actuator housing, the drag brace and the actuation pin may each be monolithic so that each is made of a single continuous material.

An implementation of a blade lock assembly may include a drag brace coupled to a fold crank and to a rotary wing blade and may further include an actuator assembly configured to be coupled to a cuff. The actuator assembly may include an actuator pin housing and an actuation pin at least partially sheathed by the actuator pin housing. The actuator assembly may be configured to extend and retract the actuation pin away from and toward the actuator pin housing.

The above referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1A:
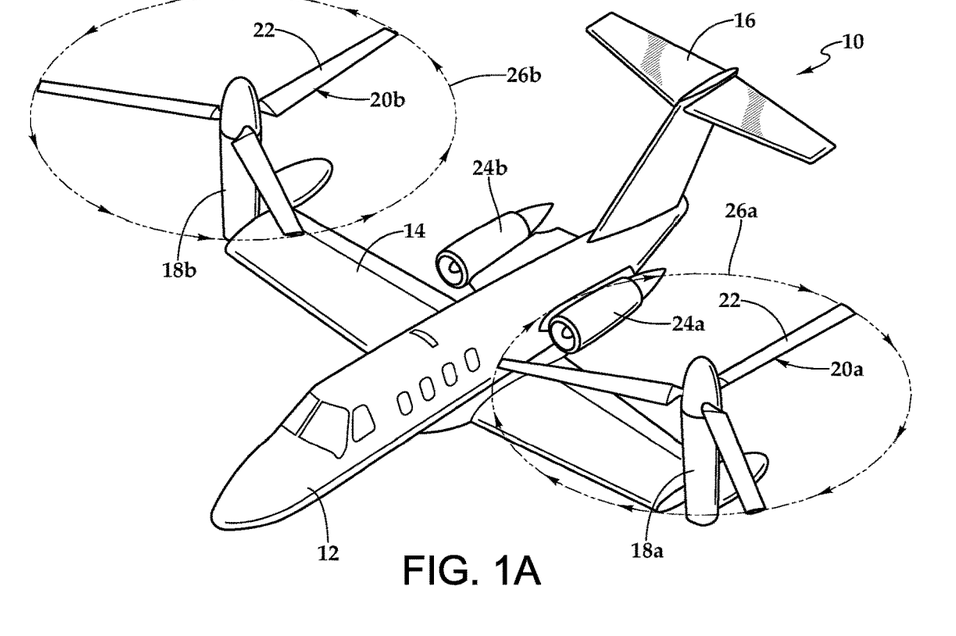
FIG. 1A illustrates a vertical takeoff and landing (VTOL) type of aircraft in a helicopter flight mode.
Figure 1B:
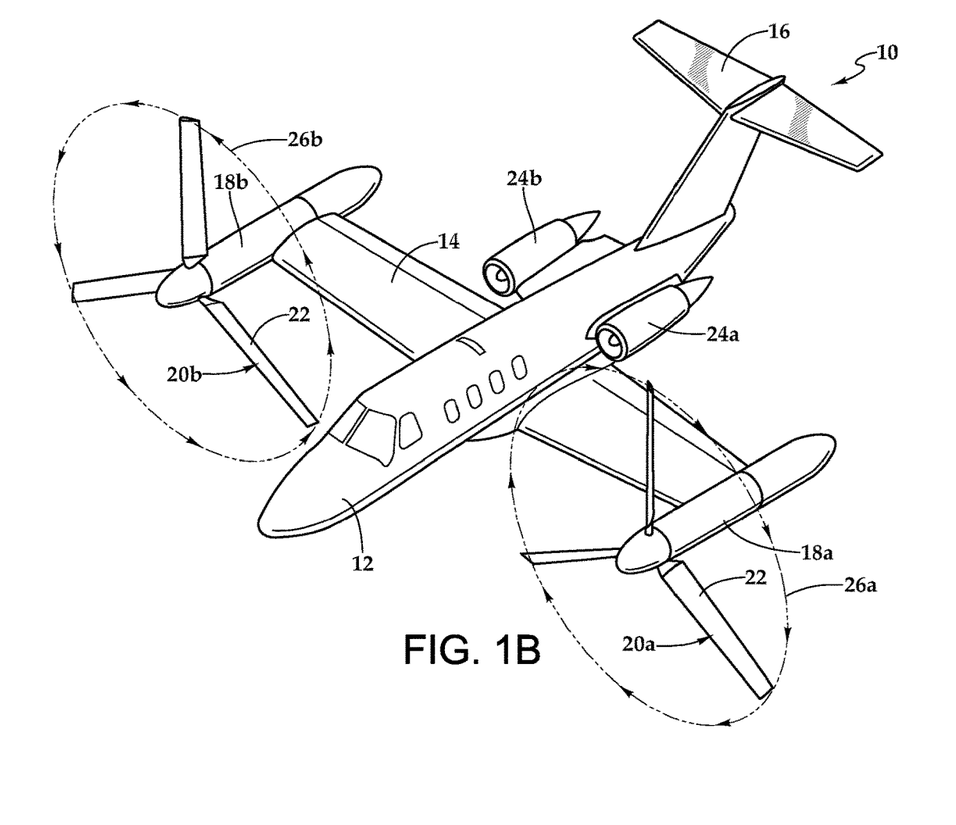
FIG. 1B illustrates the VTOL type of aircraft of FIG. 1A in a conversion flight mode.
Figure 1C:
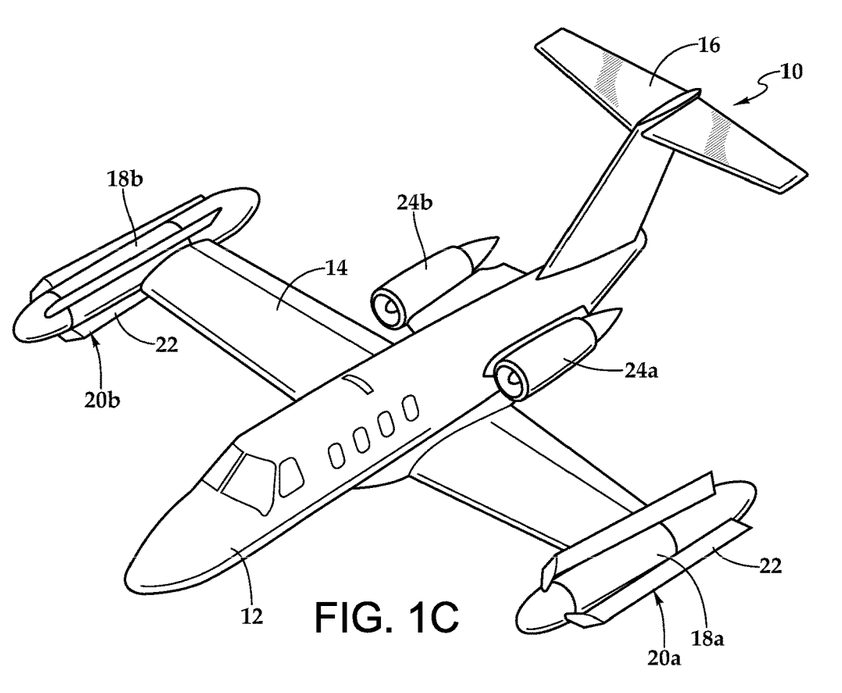
FIG. 1C illustrates the VTOL type of aircraft of FIG. 1A in a jet mode.

Referring to FIGS. 1A-1C, a tiltrotor aircraft is schematically illustrated and generally designated 10. Aircraft 10 may include a fuselage 12, a wing 14 and a tail assembly 16 including control surfaces operable for horizontal and/or vertical stabilization during forward flight. Pylon assemblies 18a and 18b may be located proximate the outboard ends of wing 14. The pylon assemblies 18a and 18b may be rotatable relative to wing 14 between a generally vertical orientation, as seen in FIG. 1A, and a generally horizontal orientation, as seen in FIGS. 1B-1C.

Pylon assemblies 18a and 18b may each house a portion of a drive system that may be used to rotate proprotor assemblies 20a, 20b, respectively. Each proprotor assembly 20a, 20b may include a plurality of proprotor blades 22 that are operable to be rotated, as seen in FIGS. 1A and 1B and operable to be folded, as seen in FIG. 1C. In the illustrated implementation, proprotor assembly 20a may be rotated responsive to torque and rotational energy provided by engine 24a and proprotor assembly 20b may be rotated responsive to torque and rotational energy provided by engine 24b. Engines 24a and 24b may be located proximate an aft portion of fuselage 12. Engines 24a and 24b may be operable in a turboshaft mode, as seen in FIGS. 1A-1B, and a turbofan mode, as seen in FIG. 1C.

FIG. 1A illustrates aircraft 10 in VTOL or helicopter flight mode, in which proprotor assemblies 20a and 20b may rotate in a substantially horizontal plane to provide a lifting thrust, such that aircraft 10 flies much like a conventional helicopter. In this configuration, engines 24a and 24b may be operable in turboshaft mode wherein hot combustion gases in each engine 24a and 24b may cause rotation of a power turbine coupled to an output shaft that is used to power the drive system coupled to the respective proprotor assemblies 20a and 20b. Thus, in this configuration, aircraft 10 may be considered to be in a helicopter flight mode.

FIG. 1B illustrates aircraft 10 in airplane/cruise mode, in which proprotor assemblies 20a and 20b may rotate in a substantially vertical plane to provide a forward thrust enabling wing 14 to provide a lifting force responsive to forward airspeed, such that aircraft 10 flies much like a conventional propeller driven aircraft. In this configuration, engines 24a and 24b may be operable in the turboshaft mode and aircraft 10 may be considered to be in the helicopter mode.

In the rotary flight mode of aircraft 10, proprotor assemblies 20a and 20b rotate in opposite directions to provide torque balancing to aircraft 10. For example, when viewed from the front of aircraft 10 in proprotor airplane/cruise mode (FIG. 1B) or from the top in helicopter mode (FIG. 1A), proprotor assembly 20a rotates clockwise, as indicated by motion arrows 26a, and proprotor assembly 20b rotates counterclockwise, as indicated by motion arrows 26b. In the illustrated implementation, proprotor assemblies 20a, 20b each include three proprotor blades 22 that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that aircraft 10 can be operated such that proprotor assemblies 20a and 20b are selectively positioned between airplane/cruise mode and helicopter mode, which can be referred to as a conversion flight mode.

FIG. 1C illustrates aircraft 10 in airplane jet mode, in which proprotor blades 22 of proprotor assemblies 20a and 20b have been folded to be oriented substantially parallel to a longitudinal axis of respective pylon assemblies 18a and 18b to minimize the drag force generated by proprotor blades 22. In this configuration, engines 24a and 24b are operable in the jet mode and aircraft 10 is considered to be in the non-rotary flight mode. The forward cruising speed of aircraft 10 can be significantly higher in jet mode versus airplane/cruise mode as the forward airspeed induced proprotor aeroelastic instability is overcome.

Even though aircraft 10 has been described as having two engines fixed to the fuselage each operating one of the proprotor assemblies in the rotary flight mode, it should be understood by those having ordinary skill in the art that other engine arrangements are possible and are considered to be within the scope of the present disclosure including, for example, having a single engine that provides torque and rotational energy to both of the proprotor assemblies. In addition, even though proprotor assemblies 20a, 20b are illustrated in the context of tiltrotor aircraft 10, it should be understood by those having ordinary skill in the art that the proprotor assemblies disclosed herein can be implemented on other tiltrotor aircraft including, for example, quad tiltrotor aircraft having an additional wing member aft of wing 14, unmanned tiltrotor aircraft or other tiltrotor aircraft configurations.

Figure 2A:
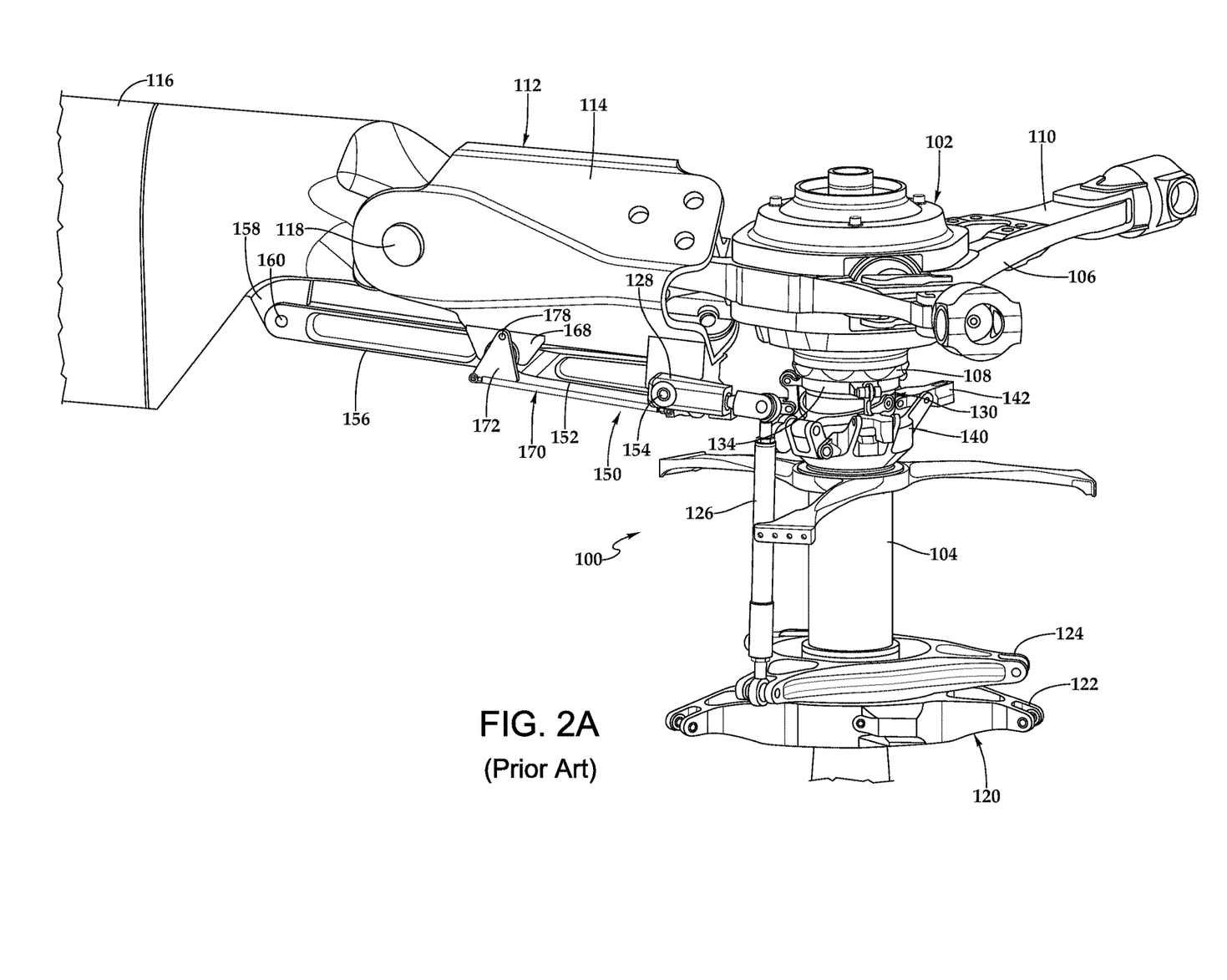
FIGS. 2A-2C illustrate a prior art rotor hub and rotary wing connection in respective helicopter flight, airplane/cruise flight and jet modes.
Figure 2B:
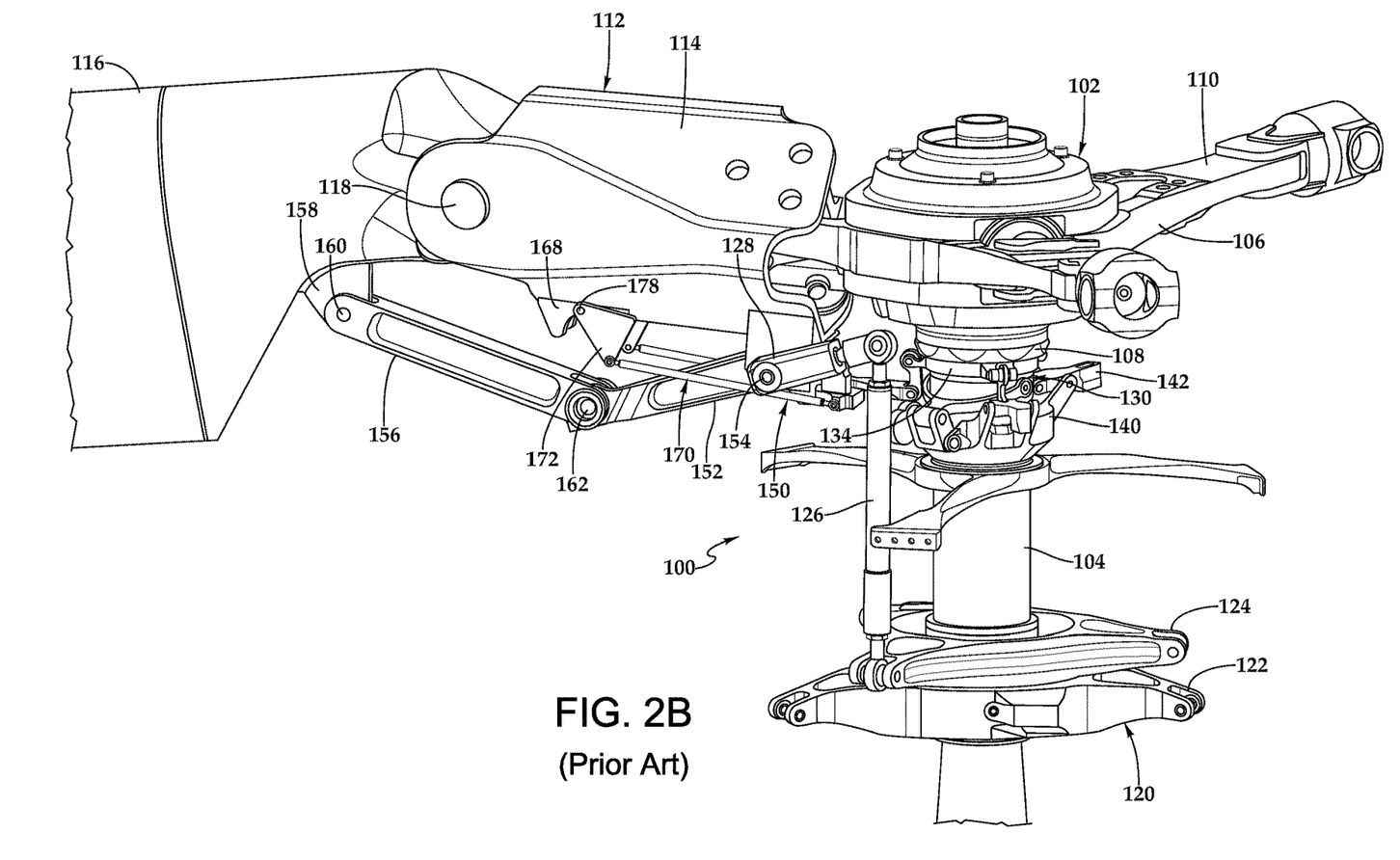
Figure 2C:
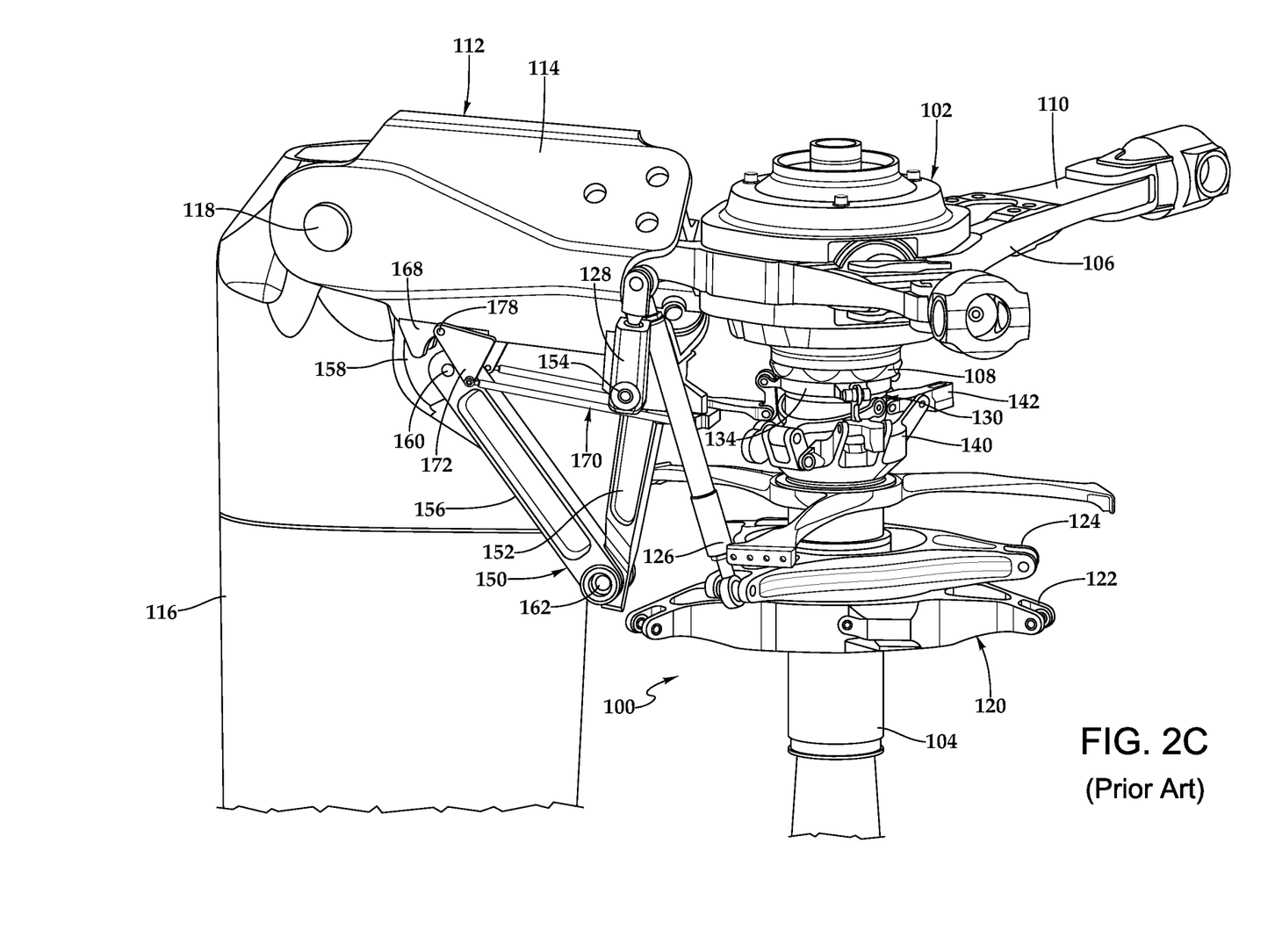

Referring to FIGS. 2A-2C, a prior art mechanism for transitioning a tiltrotor aircraft between rotary and non-rotary flight modes is depicted and generally designated 100. In the illustrated implementation, a rotor assembly 102 is depicted as a gimbal mounted, three bladed rotor assembly having a gimballing degree of freedom relative to a mast 104. Rotor assembly 102 includes a rotor hub 106 that is coupled to and operable to rotate with mast 104. Rotor hub 106 has a conical receptacle 108 extending from a lower portion thereof. The conical receptacle 108 may be provided to prevent flapping of the hub 106. Rotor hub 106 includes three arms 110 each of which support a rotor blade assembly 112, only one being visible in the figures. Each rotor blade assembly 112 includes a cuff 114 and a rotor blade 116 that is pivotably coupled to the cuff 114 by a connection member depicted as pin 118. As discussed herein, rotor blade assembly 112 has a pitching degree of freedom during rotary flight and a folding degree of freedom during non-rotary flight.

The pitching and folding degrees of freedom of rotor blade assembly 112 are realized using a swash plate 120. Swash plate 120 includes a non-rotating lower swash plate element 122 and a rotating upper swash plate element 124. Swash plate element 124 is operably coupled to each rotor blade assembly 112 at cuff 114 via a pitch link 126 and a pitch horn 128, only one such connection being visible in the figures. A control system including swash plate actuators (not pictured) is coupled to swash plate element 122. The control system operates responsive to pilot input to raise, lower and tilt swash plate element 122 and thus swash plate element 124 relative to mast 104. These movements of swash plate 120 collectively and cyclically control the pitch of rotor blade assemblies 112 during rotary flight and fold rotor blade assemblies 112 during non-rotary flight.

The prior art transitioning mechanism 100 includes a prior art blade lock assembly 150 (also known as a chord lock assembly) at each rotor blade 116. As illustrated, each prior art blade lock assembly 150 includes a crank 152 that is rotatably coupled to cuff 114 and rotatable with pitch horn 128 via a connection member depicted as pin 154. In this manner, rotation of crank 152 is responsive to the rise and fall of swash plate 120 in non-rotary flight. Each prior art blade lock assembly 150 also includes a link 156 that is rotatably coupled to rotor blade 116 at lug 158 via a connection member depicted as pin 160. Crank 152 and link 156 are coupled together at a pivot joint 162.

Figure 3:
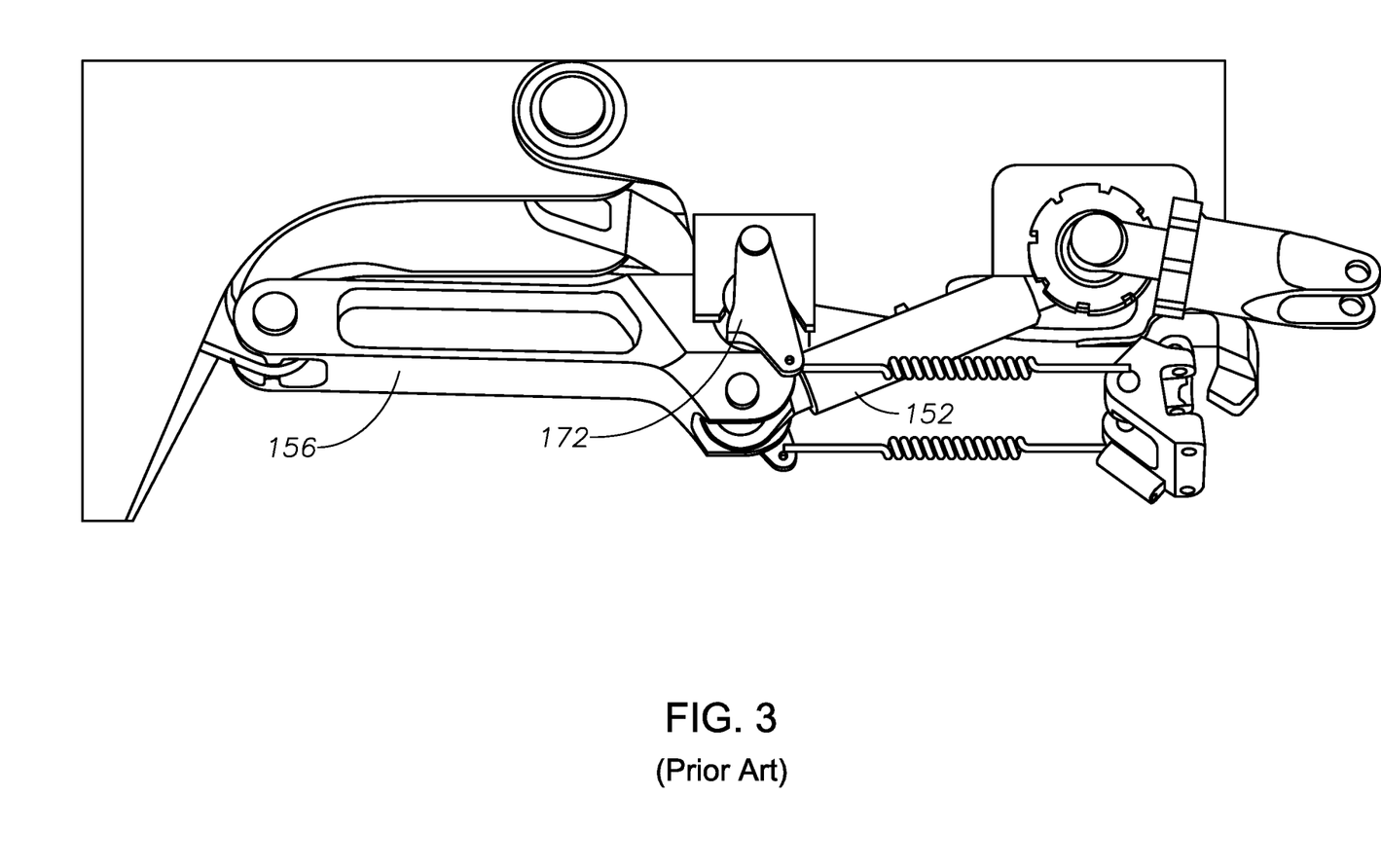
FIG. 3 illustrates a prior art blade lock device.

With further reference to FIGS. 2A-2C and additionally to FIG. 3, each prior art blade lock assembly 150 further includes a blade lock 170 having a fold lock position securing pivot joint 162 to cuff 114 and a pitch lock position securing cuff 114 to arm 142 of blade stop assembly 140. More specifically, each blade lock 170 includes a fold lock 172 that contacts a respective roller element at an arm and provides maximum contact force when the fold lock 172 is fully engaged.

Figure 4:
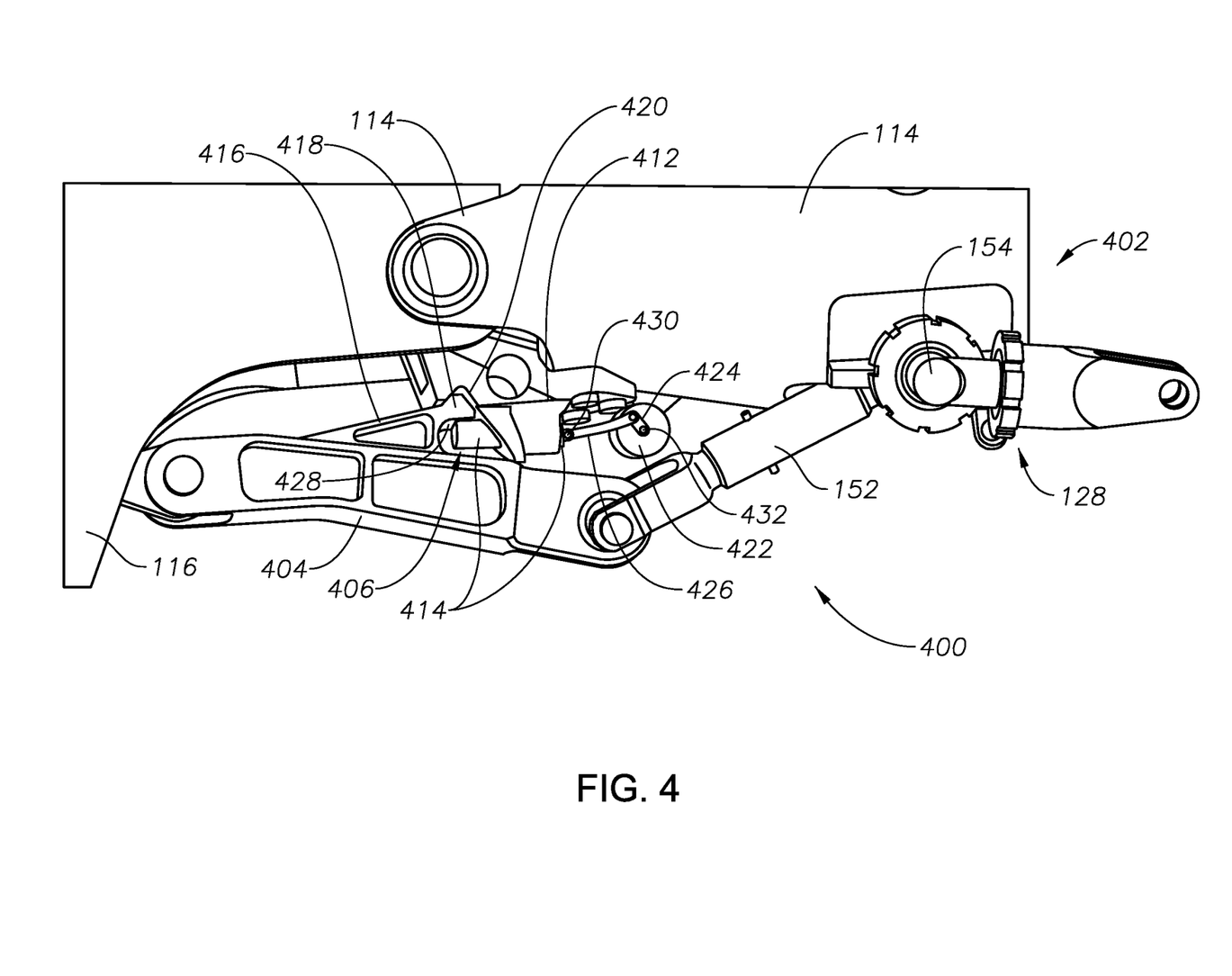
FIG. 4 illustrates an implementation of a blade lock device.

FIG. 4 illustrates an implementation of the present blade lock assembly 400. The blade lock assembly 400 may include a fold crank assembly 402, a drag brace 404 and an actuator assembly 406. The fold crank assembly 402 may include the crank 152 and the pitch horn 128, which may be connected to each other at the pin 154, i.e., a fold crank pivot, to cuff 114. The pin 154 may connect the crank 152 to the pitch horn 128. An end of the drag brace 404 may be connected to an end of the crank 152 and an end of the drag brace 404 that opposes the end that is connected to the crank 152 may be coupled to blade 116.

The drag brace 404 may include a finger 416. The finger 416 may extend from the drag brace 404 toward the cuff 114 when the blade lock assembly 400 is in a locked configuration as shown in FIG. 4. The finger 416 may include a tab 418 at a distal end thereof. The tab 418 may be a ridge that extends the entire width of the finger 416 or that extends a partial and/or intermittent width of the finger 416. The tab 418 may protrude from the finger 416 in a direction away from the drag brace 404.

The actuator assembly 406 may be coupled to the cuff 114. The actuator assembly may define an actuator pin housing recess 420 and may include an actuator pin housing 412, an actuator pin 414, an actuator arm 424 and an actuator motor 422. The actuator pin 414 may be at least partially sheathed by, e.g., circumferenced by, the actuator pin housing 412.

The actuator pin housing recess 420 may have a profile negatively corresponding to a profile of the tab 418. For example, the actuator pin housing recess 420 may be configured such that it engages with the tab 418 in a manner that substantially all of the surface area of the tab 418 engages the actuator pin housing recess 420. However, it is unnecessary that the profiles of the tab 418 and the actuator pin housing recess 420 correspond to any significant degree for the present implementation to operate as intended.

The actuator motor 422 may be configured to extend and retract the actuator pin 414 into and out of the actuator pin housing 412. For example, in some implementations, the actuator motor 422 may be attached to an actuator arm 424, which may be attached to a connecting rod 426. The connecting rod 426 may be attached to a connector 430 (which may be a ring, a bracket a ball-and-socket joint, etc.) on an end of the actuator pin 414. The actuator arm 424 may be driven, i.e., rotated about an output rotational axis 432 of the motor 422, by the actuator motor 422. The connecting rod 426 may be attached to the actuator arm 424 so that it is reciprocally driven thereby and capable of extending and/or retracting the actuator pin 414 in response to rotation of the actuator arm 424. In further implementations, the actuator may be a screw [not shown] that is driven by a motor. In a screw implementation, the motor may be configured so that the motor's output axis of rotation is axially parallel to the actuator pin 414.

When extended, the actuator pin 414 locks the blade lock assembly 400 and, therefore, the blade 116, in the vertical flight mode or airplane/cruise mode. For example, the actuator pin 414 engages an actuator pin engagement surface 428 to enable locking of the blade lock assembly 400. When the blade lock assembly is unlocked, the actuator pin 414 is retracted into the actuator pin housing 412 far enough so that the tab 418 is free to disengage the actuator pin housing recess 420. Once disengaged, the drag brace 404 may move away from the actuator pin housing 412, the cuff 114 and the blade 116.

The actuator assembly 406 may be positioned between the drag brace 404 and the cuff 114. The size of the actuator assembly 406 relative to the drag brace 404 and the cuff 114 may provide clearance for the actuator assembly 406 in the locked configuration in which the actuator assembly 406 is bookended, e.g., adjacent on opposing sides thereof, by the drag brace 404 and the actuator assembly 406. The size of the actuator assembly 406 may result in reduced weight of the blade lock assembly 400.

Further, manufacture of the present implementation may be simplified due to a reduction in the parts required to make the present implementation. Each of the drag brace 404, the actuation pin housing 412, and the actuation pin 414 may be monolithic to provide additional weight and manufacturing process saving benefits.

Referring again to FIGS. 2A-2C, when it is desired to transition the tiltrotor aircraft from the rotary flight mode to the non-rotary flight mode, the swash plate 120 is caused by main rotor actuators (not shown) to slide along the mast 104 and pull or push against the pitch link 126. Although a single pitch link 126 is illustrated, multiple pitch links 126 may be present in implementations. Simultaneous displacement of the multiple pitch links 126 by the swash plate 120 may cause simultaneous rotation of the fold crank 402 attached via the chord path lock to its respective blade. Rotation of the fold crank 402 may cause the drag brace 404 to rotate away from the cuff 114. If the actuator pin 414 is disengaged from the actuator pin engagement surface 428, the drag brace may be allowed to rotate away from the cuff 114 and the blade 116 may fold down into the jet mode position illustrated in FIG. 1C.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention is not limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential.

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementation.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An assembly comprising:
    a rotary wing cuff; and
    a plurality of rotary wing blades, a blade lock assembly coupled to a respective rotary wing blade and including:
    a drag brace coupled to the respective rotary wing blade and including a finger extending from the drag brace and terminating at an end comprising first and second opposite surfaces, wherein the first surface comprises a tab extending away from the drag brace and the second surface is an actuator pin engagement surface facing the drag brace; and
    an actuator assembly coupled to the rotary wing cuff and including:
       an actuator pin housing defining an actuator pin housing recess,
       an actuator pin at least partially sheathed by the actuator pin housing, and
       an actuator configured to extend and retract the actuator pin away from and toward the drag brace in a space defined by the second surface of the finger and the drag brace,
    wherein:
       the finger extends from the drag brace towards the rotary wing cuff;
       the tab is configured to contact the actuator pin housing recess when the blade lock assembly is in a locked configuration; and
       the actuator pin engagement surface of the finger is configured to contact the actuator pin when the blade lock assembly is in a locked configuration.

2. The assembly as recited in claim 1, wherein the drag brace is on a first side of the actuator pin housing when the blade lock assembly is in a locked configuration and the cuff is on a second side of the actuator pin housing when the blade lock assembly is in a locked configuration, the second side opposing the first side.

3. The assembly as recited in claim 2, wherein the actuator assembly is between the drag brace and the cuff when the blade lock assembly is in a locked configuration.

4. The assembly as recited in claim 1, wherein the actuator assembly is configured to actuate the actuator pin via a rotary displacement motion.

5. The assembly as recited in claim 1, wherein the actuator assembly is configured to actuate the actuator pin via an axial displacement motion.

6. The assembly as recited in claim 1, wherein the actuator housing, the drag brace and the actuator pin are each independently monolithic.

7. A blade lock assembly comprising:

a rotary wing cuff;
a drag brace configured to be coupled to a rotary wing blade and comprising a finger extending from the drag brace and terminating at an end comprising first and second opposite surfaces, wherein the first surface comprises a tab extending away from the drag brace and the second surface is an actuator pin engagement surface facing the drag brace; and
an actuator assembly configured to be coupled to the rotary wing cuff and including:
    an actuator pin housing defining an actuator pin housing recess,
    an actuator pin at least partially sheathed by the actuator pin housing, and
    an actuator configured to extend and retract the actuator pin away from and toward the drag brace in a space defined by the second surface of the finger and the drag brace,
wherein:
    the finger extends from the drag brace toward the rotary wing cuff;
    the tab is configured to contact the actuator pin housing recess when the blade lock assembly is in a locked configuration; and
    the actuator pin engagement surface of the finger is configured to contact the actuator pin when the blade lock assembly is in a locked configuration.

8. The blade lock assembly as recited in claim 7, wherein the drag brace is on a first side of the actuator pin housing when the blade lock assembly is in a locked configuration and the cuff is on a second side of the actuator pin housing when the blade lock assembly is in a locked configuration, the second side opposing the first side.

9. The blade lock assembly as recited in claim 8, wherein the actuator assembly is between the drag brace and the cuff when the blade lock assembly is in a locked configuration.

10. The blade lock assembly as recited in claim 7, wherein the actuator assembly is configured to actuate the actuator pin via a rotary displacement motion.

11. The blade lock assembly as recited in claim 7, wherein the actuator assembly is configured to actuate the actuator pin via an axial displacement motion.

12. The blade lock assembly as recited in claim 7, wherein the actuator housing, drag brace and the actuator pin are each independently monolithic.

* * * * *